Patented June 1, 1937

2,082,358

UNITED STATES PATENT OFFICE 2,082,358

2-METHYL-3-HYDROXYQUINOLINE-4-CARBOXYLIC ACIDS AND A PROCESS OF PREPARING THEM

Hans Schlichenmaier, Kelkheim in Taunus, and Ludwig Schörnig, Frankfort-on-the-Main, Germany, assignors to General Aniline Works, Inc., New York, N. Y., a corporation of Delaware No Drawing. Application January 11, 1935, Serial No. 1,446. In Germany January 19, 1934

7 Claims. (Cl. 260—39)

The present invention relates to 2-methyl-3-hydroxyquinoline-4-carboxylic acids and to a process of preparing them.

According to a publication by Berlingozzi and Capuano (cf. Atti R. Accad. dei Lincei, Roma [5] 33.II.92 and Chemisches Zentralblatt, 1924, II, page 2657) 2-methyl-3-hydroxyquinoline-4-carboxylic acid may be prepared by condensing isatin or the sodium salt of isatic acid with chloracetone in a dilute solution of sodium carbonate. The manufacture as disclosed in the said references is performed by allowing the solution of the sodium salt of isatic acid and chloracetone in a dilute solution of sodium carbonate to stand for several days at room temperature and acidifying the solution, whereupon 2-methyl-3-hydroxyquinoline-4-carboxylic acid is said to separate. On carrying out the above process, we have found that on acidifying the reaction mixture, which was allowed to stand for 5 days, with acetic acid only traces of 2-methyl-3-hydroxyquinoline-4-carboxylic acid separate. On acidifying the solution with hydrochloric acid and boiling, the main quantity of the isatin used could be recovered. By carrying out the reaction of the sodium salt of the isatic acid with chloracetone in sodium carbonate solution at a higher temperature (the said conditions were applied in order to shorten the duration of the reaction and, if possible, to enhance the yield), and essential progress was not obtained. Thus, for instance, even at 80° C. to 90° C. the reaction was not yet finished after 24 hours since, also in this case, large quantities of unchanged isatin could easily be detected.

Now, we have found that 2-methyl-3-hydroxyquinoline-4-carboxylic acids may be obtained with a very good yield and in a much shorter time by reacting halogen-acetone upon salts, for instance, alkali or alkaline-earth metal salts, of isatic acids in the presence of alkaline-earth hydroxides, preferably at a temperature between room temperature and about 100° C. It is also possible to start directly from isatin; in this case the condensation is preferably performed with the aid of heat in the presence of correspondingly larger amounts of alkaline-earth hydroxides.

By starting from isatin, there occurs at first a cleavage of the isatin, for instance, to the corresponding alkaline-earth metal salt of the isatic acid, which by the influence of the excess of alkaline-earth hydroxide reacts with the chloracetone with formation of the 2-methyl-3-hydroxyquinoline-4-carboxylic acid. The process may also be performed by splitting up the isatin with the calculated amount of caustic alkali to the corresponding alkali salt and condensing the latter as above described in the presence of alkaline-earth hydroxides.

By carrying out the condensation of the isatin or of the calcium salt of isatic acid, for instance, at 60° C. to 90° C. in an excess of dilute milk of lime, the reaction is finished already after about 5 hours and with a nearly quantitative yield so that there may easily be obtained yields of above 90 percent to 95 percent of 2-methyl-3-hydroxyquinoline-4-carboxylic acid.

Instead of calcium hydroxide there may also be used with a like good result other alkaline-earth hydroxides, such as, for instance, magnesium hydroxide, strontium hydroxide.

By using in the said reaction instead of isatin its derivatives, such as, for instance, methyl- or halogen-isatins, there are obtained in a smooth reaction the correspondingly substituted 2-methyl-3-hydroxyquinoline-4-carboxylic acids.

The 2-methyl-3-hydroxy-quinoline-4-carboxylic acids constitute yellow powders which are easily soluble in dilute sodium carbonate solution. When heated above the melting point, they decompose with elimination of $CO_2$ and yield the corresponding hydroxyquinaldines. $CO_2$ is also split off on heating in a solvent of high boiling-point, for instance, nitro- or trichlorobenzene. With diazo compounds the 2-methyl-3-hydroxy-quinoline-4-carboxylic acids react also with elimination of $CO_2$ and formation of the corresponding azo-dyestuffs. On splitting off the latter by reduction, there may easily be obtained the 2-methyl-3-hydroxy-4-aminoquinolines. The 2-methyl-3-hydroxyquinoline-4-carboxylic acids may be used for the manufacture of dyestuffs and pharmaceutical products.

The following examples serve to illustrate the invention, but they are not intended to limit it thereto; the parts being by weight:

(1) 700 parts of water and 18 parts of quicklime are stirred in a vessel to form a mobile milk of lime. 23.52 parts of isatin are added thereto; the whole is then heated to 80° C. until a light-yellow thinly liquid magma of the calcium salt of isatic acid is obtained. 16 parts of chloracetone are slowly run into this magma, while stirring thoroughly; stirring is continued for 5 to 6 hours at 80° C. to 90° C. The whole is then allowed to cool and concentrated hydrochloric acid is added to the reaction mass until the latter has become feebly acid to Congo paper and the 3-hydroxyquinaldine-4-carboxylic acid has separated. It is filtered through a suction filter, washed with water and dried. There are obtained 32.0 parts of 2-methyl-3-hydroxyquinoline-4-carboxylic acid, containing 1.5% of ash. The yield amounts to 32.2 parts, calculated upon the isatin used. The carboxylic acid obtained has the same properties as the 2-methyl-3-hydroxyquinoline-4-carboxylic acid, described by Berlingozzi and B. Capuano.

(2) 18 parts of water and 0.132 part of quicklime are stirred together until a thinly liquid milk of lime is obtained. A solution of 0.132 part of 5-phenylisatin in 1.2 parts of dioxane and 1 part of alcohol is added thereto while well stirring and the whole is heated to 80° C. When the formation of the calcium salt of 5-phenylisatic acid is finished, 0.12 part of chloracetone is dropped into the mass during 1 to 2 hours and stirring is continued for 4 to 5 hours at 80° C. to 90° C. The whole is then allowed to cool and the reaction mass is rendered acid to Congo paper by means of concentrated hydrochloric acid. The light-yellow magma of 6-phenyl-3-hydroxy-2-methyl-4-quinoline-carboxylic acid is filtered by suction and washed with water until it is free from salt. The yield of 6-phenyl-3-hydroxy - 2 - methyl- 4 - quinoline-carboxylic acid amounts, after drying, to 0.155 part, whereas the calculated yield amounts to 0.163 part. The carboxylic acid may be purified by dissolving it in sodium carbonate solution and reprecipitating it, after filtering, by means of hydrochloric acid. The yield of purified acid amounts to 0.15 part= 92 percent, calculated upon the 5-phenylisatin used. The 2-methyl-3-hydroxy-6-phenylquinoline-4-carboxylic acid forms a yellow powder which melts at 246° C. while strongly frothing (elimination of $CO_2$), solidifies again and melts once more at 270° C. to 277° C. The carboxylic acid is easily soluble in warm sodium carbonate solution. On heating it in nitrobenzene, the carboxylic acid loses $CO_2$ and yields 6-phenyl-3-hydroxy-2-methylquinoline.

(3) While stirring thoroughly, 21.5 parts of 5.7-dichloroisatin are added to 2000 parts of a milk of lime which contains 20 parts of calcium oxide. The temperature of the mixture is then slowly raised to 80° C. to 90° C. When the cleavage of the 5.7-dichlorisatin is finished, 15 parts of chloracetone are gradually dropped into the thin magma and the whole is stirred for 4 to 5 hours at 80° C. to 90° C. Thereby the calcium salt of 2-methyl-3-hydroxy-6.8-dichloroquinoline-4-carboxylic acid is formed; on acidification with concentrated hydrochloric acid the said carboxylic acid may easily be obtained in the form of a light-yellow powder. The yield amounts to 25 parts. The theoretical yield calculated upon the 5.7 - dichlorisatin used amounts to 27 parts. The 2-methyl-3-hydroxy-6.8-dichloroquinoline-4-carboxylic acid melts at 232° C. with decomposition. By splitting off $CO_2$, 2-methyl-3-hydroxy-6.8-dichloroquinoline is obtained which melts at 259° C. to 260° C.

2 - methyl - 3 - hydroxy - 6.8 - dichloroquinoline-4-carboxylic acid is easily soluble in an excess of dilute sodium carbonate solution and is re-precipitated on acidification. The monosodium salt of the acid may easily be obtained in a crystallized form (small needles).

(4) 49 parts of isatin are stirred at 80° C. with 2000 parts of water and 266 parts of crystallized strontium hydroxide until a uniform thin magma is obtained. In the course of 2 hours 35 parts of chloracetone are added thereto and stirring, while hot, is continued for 6 hours.

The strontium salt of 3-hydroxyquinaldine-4-carboxylic acid separtes in the form of colorless small needles, the 3-hydroxyquinaldine-4-carboxylic acid itself is obtained after acidification of the recation mass with dilute hydrochloric acid in the form of a yellow precipitate; it is filtered with suction, washed with water and dried and has the same properties as the acid obtained according to Example 1. The yield amounts to 65 parts, corresponding to 96 percent of the calculated amount of 67.7 parts.

(5) 49 parts of isatin are stirred with 2000 parts of hot water and 153 parts of barium oxide to form a uniform thin magma and at 80° C. to 90° C., 35 parts of chloracetone are gradually dropped into the magma. The whole is then stirred for 4 to 5 hours and the reaction product is rendered acid to Congo paper by means of dilute hydrochloric acid. The 2-methyl-3-hydroxyquinoline-4-carboxylic acid thus formed separates in the form of a yellow precipitate. It is filtered with suction, washed and dried. The yield amounts to 61 parts corresponding to 90 percent of the calculated yield of 67.7 parts. It has the same properties as the 2-methyl-3-hydroxyquinoline-4-carboxylic acid obtained according to Example 1.

(6) 49 parts of isatin are heated at 80° C. with 60 parts of magnesium oxide and 2000 parts of water, while stirring, until the isatin has reacted to form the magnesium salt of the isatic acid. 75 parts of chloracetone are then added drop by drop whereupon the whole is stirred for about 6 hours. The reaction product is rendered acid to Congo paper by means of hydrochloric acid and the 2-methyl-3-hydroxyquinoline - 4 - carboxylic acid which has separated in the form of a light-yellow precipitate, is filtered with suction, washed with water and dried. The yield amounts to 56.5 parts, corresponding to 83.5 percent of the calculated amount (viz. 67.7 parts). It has the same properties as the 2-methyl-3-hydroxy-quinoline-4-carboxylic acid obtained according to Example 1.

(7) 56 parts of quicklime are stirred with 2000 parts of water to form a thin milk of lime. 49 parts of isatin are added and the mixture is then warmed, while stirring. As soon as the calcium salt of isatic acid has been formed, 35 parts of bromacetone are dropped in and the whole is stirred for several hours. By acidifying the reaction mass with dilute hydrochloric acid, the 2-methyl-3-hydroxyquinoline-4-carboxylic acid is obtained in the form of a light-yellow precipitate. The yield amounts to 67 parts, corresponding to 99 percent of the calculated amount of 67.7 parts. The properties of the product obtained are the same as those of the acid obtained according to Example 1.

(8) 56 parts of quicklime, 2000 parts of water and 49 parts of isatin are converted as described in Example 7 to the calcium salt of isatic acid. At about 80° C., 50 parts of iodo-acetone are dropped into the reaction mass and the whole is then stirred for about 5 hours. By acidification with dilute hydrochloric acid the 2-methyl-3-hydroxyquinoline-4-carboxylic acid thus formed is obtained in the form of a light-yellow precipitate. The yield amounts to 61 parts, corresponding to 90 percent of the calculated amount (i. e. 67.7 parts). The product obtained has the same properties as the 2-methyl-3-hydroxy-4-quinoline-carboxylic acid, obtainable according to Example 1.

(9) 14.7 parts of isatin are stirred with 4.4 parts of caustic soda (about 93 to 95 percent of NaOH) and 500 parts of water until the solution has assumed a yellow color. 6.2 parts of quicklime, which has advantageously been slaked with water to a dry powder, are added. While well stirring, 10.12 parts of chloracetone are then added, drop by drop, to the thinly liquid reaction mass, and stirring is continued until isatin can no longer be detected in the reaction liquid. The temperature is preferably maintained during the whole course of reaction between 60° C. and 80° C. The 2-methyl-3-hydroxyquinoline-4-carboxylic acid thus formed is separated in the form of a yellow precipitate by adding hydrochloric acid to the reaction mixture. The yield is very good (about 90 percent). The carboxylic acid obtained has the same properties as the 2-methyl-3-hydroxyquinoline-4-carboxylic acid obtainable according to Example 1.

Instead of converting the isatin at first with caustic soda solution in an aqueous solution to the sodium salt of isatic acid and adding then the caustic lime, it is also possible to use the caustic lime simultaneously with the caustic soda solution or to react at first the isatin with the caustic lime and to add then the caustic soda. The yield is the same.

We claim:

1. The process which comprises reacting at a temperature between room temperature and about 100° C. a halogen-acetone upon a salt of an isatic acid of the group consisting of alkali and alkaline-earth metal salts of isatic acid in the presence of an alkaline-earth hydroxide and water.

2. The process which comprises reacting at a temperature between room temperature and about 100° C. a halogen-acetone upon an aqueous paste of an alkaline-earth metal salt of an isatic acid in the presence of a hydroxide of an alkaline-earth metal of the same kind.

3. The process which comprises heating at a temperature between about 60° C. to about 90° C. a halogen-acetone with a salt of an isatic acid of the group consisting of alkali and alkaline-earth metal salts of isatic acid in the presence of an alkaline-earth hydroxide and water.

4. The process which comprises adding at a temperature of about 60° C. to about 80° C. chloracetone to an aqueous paste of the sodium salt of isatic acid and calcium hydroxide and continuing heating at this temperature for some hours.

5. The process which comprises adding at a temperature of about 80° C. to about 90° C. chloracetone to an aqueous paste of the calcium salt of 5-phenyl-isatic acid and calcium hydroxide and continuing heating at this temperature for some hours.

6. The process which comprises adding at a temperature of about 80° C. to about 90° C. chloracetone to an aqueous paste of the calcium salt of 5.7-dichlorisatic acid and calcium hydroxide and continuing heating at this temperature for some hours.

7. The compound of the formula:

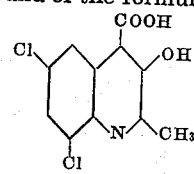

being, when dry, a light-yellow powder, dissolving in an excess of dilute sodium carbonate solution, melting at 232° C. with decomposition.

HANS SCHLICHENMAIER.
LUDWIG SCHÖRNIG.